United States Patent [19]

Wolf

[11] Patent Number: 4,887,952
[45] Date of Patent: Dec. 19, 1989

[54] NAIL PLATE

[75] Inventor: Johann Wolf, Scharnstein, Austria

[73] Assignee: Johann Wolf GmbH Kg, Austria

[21] Appl. No.: 152,478

[22] Filed: Feb. 5, 1988

[30] Foreign Application Priority Data

Feb. 5, 1987 [EP] European Pat. Off. ........ 87101537.6

[51] Int. Cl.⁴ .............................................. F16B 15/00
[52] U.S. Cl. ..................................... 411/466; 411/470
[58] Field of Search ............... 411/466, 467, 468, 470, 411/457, 921; 403/405.1, 283; 52/712, 693, 694, 642

[56] References Cited

U.S. PATENT DOCUMENTS

| 3,261,137 | 7/1966 | Jureit | 411/921 X |
| 3,731,583 | 5/1973 | Jureit | 411/466 |
| 3,910,153 | 10/1975 | Jureit | 411/466 |
| 4,209,265 | 6/1980 | Moehlenpah | 411/461 X |
| 4,442,649 | 4/1984 | Birckhead et al. | 52/693 |
| 4,710,083 | 12/1987 | Wolf | 403/405.1 X |
| 4,737,060 | 4/1988 | Birckhead | 411/468 |
| 4,782,641 | 11/1988 | Manenti et al. | 52/639 |

FOREIGN PATENT DOCUMENTS 531990 8/1931 Fed. Rep. of Germany ...... 411/466
2613522 10/1977 Fed. Rep. of Germany ...... 411/466

Primary Examiner—Rodney M. Lindsey
Attorney, Agent, or Firm—Wm. D. Johnston, III

[57] ABSTRACT

A nail plate, intended especially for joining wooden beams, is made with columns of nails formed by tongue-shaped punch-outs. The punch-outs are arranged in parallel to a pair of longitudinal edges of the plate, and at least one of a front edge and a rear edge, each extending diagonally between the longitudinal edges, has a stepped pattern.

4 Claims, 2 Drawing Sheets

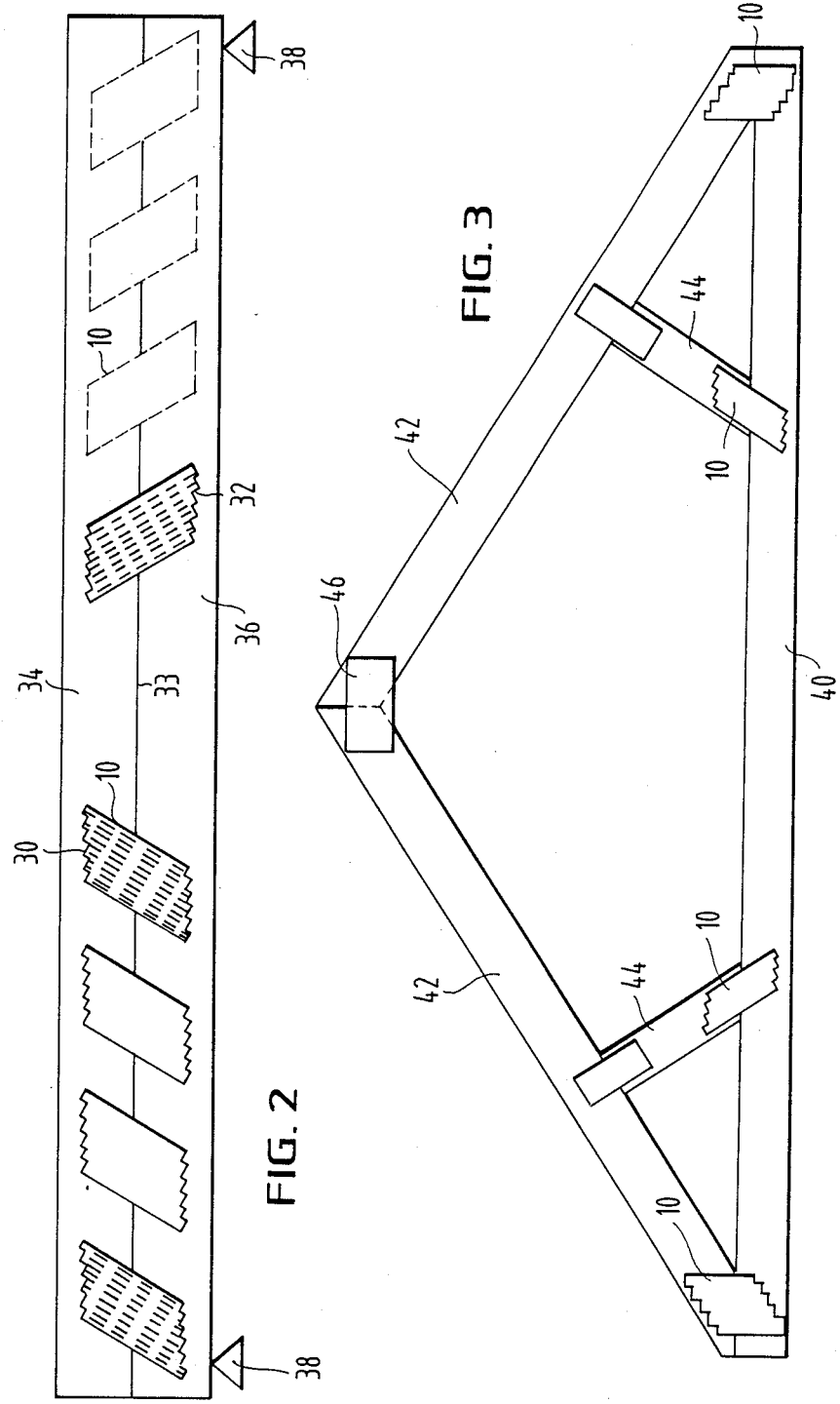

NAIL PLATE

BACKGROUND OF THE INVENTION:

The invention concerns a nail plate, intended specially for the joining of wooden components, consisting of a sheet-metal plate with several rows columns of nails formed by tongue-shaped punch-outs.

A nail plate of this type is known from EPC patent application No. 85 89 0234.9. In the nail plate therein described, individual punch-outs from which the nails are formed run parallel to the longitudinal sides of a rhomboidal plate, while base points of the nails are parallel to the joint between the connected beams.

The alignment of nails parallel to the joint has proven to be a disadvantage with this design, since it results in an orientation approximately in line with the grain of the wood. A splitting effect exerted by each respective row or column of nails increases, the more closely the row of nails is aligned with the wood grain. With increasing or oscillating load and at maximum load, documented cases have shown the danger of nails loosening, thereby reducing the bearing strength of the plate.

Another disadvantage of this prior art nail plate is its relatively high manufacturing cost. The reason is that when the plate during manufacture is stripped along the sides parallel to the joint, the diagonal sides require a trimming cut which unavoidably leads to waste. If, to prevent this waste, one wishes to run the plates through the punching equipment in the direction of the diagonal, lateral edges, the punching tool stampers must be staggered, which requires costly modification of the punching tool.

A final disadvantage of the described nail plate is that it has no nails in its central area. A considerable portion of the nail plate thus fails to contribute to its joining power.

SUMMARY OF THE INVENTION:

A purpose of the invention is to produce a nail plate which has an exceptional tacking effect and can be economically manufactured, starting from the state of technology described above.

According to the present invention, this task is resolved by employing a nail plate consisting of a sheet metal plate with nails formed by tongue-shaped punchouts arranged in several columns which are aligned parallel to the longitudinal edges of the plate. The front and rear edge of the nail plate are designed to be essentially diagonal to the longitudinal edges. Front and/or rear edges of the nail plate are preferably designed in a stepped pattern.

The present invention provides numerous advantages. A first advantage is that the columns of nail bases are not parallel to the grain of the beams being joined by the nail plate. If these nail plates are installed with their lateral edges approximately parallel to the seam between two adjoining beams, the rows of nail bases arranged transversely across the nail plate as well as the columns of nail bases arranged parallel to the longitudinal sides of the nail plate will run diagonally to the seam between the adjoining beams. Furthermore, the broad side of each individual flat nail will be diagonal to the seam. Hereby the tacking effct of the each respective row or column of nails is increased and the risk of the joint loosening upon vibration or when subjected to maximum loading is considerably diminished.

An additional advantage is that the tacking effect of this nail plate is further increased relative to existing nail plates because nails are punched out over its entire surface, thus providing a greater number of nails to achieve the tacking effect.

A final advantage is that the nail plates can be produced very economically according to a process provided by the present invention. The front and rear edges of the nail plate can be designed to form identical series of rising or falling steps from one longitudinal edge to the other. This design type has the advantage of giving the nail plate a rhomboidal external form and capitalizing on the inherent advantages of such a shape.

In another design variation of the invention, the relative distance between steps at the front edge of the nail plate is provided to be equal in each case to the respective distance between steps at the rear edge. This design variation firstly has the advantage of permitting economical production of the nail plates, because the stepped cuts in each case can be made with the same tool. An additional advantage is that these nail plates can be placed directly end-to-end without gap, when desirable or necessary.

A further variation of the invention alternates the direction of adjoining, lateral punch-outs. This improvement has the advantage of maintaining maximum stability in the nail plate itself.

It is expedient to leave a distance greater that the length of the punch-out between the base points of a transverse column of nails being punched out between the lateral edges of the plate and the opposite column of nail base points. This design according to the present invention also contributes to maintaining maximum stability in the nail plate. An additional advantage is hereby obtained, permitting the nail plate to be made of relatively thin sheet metal, once again reducing the cost of the nail plates.

An equal distance is in each case maintained between column of punch-outs aligned in the same direction.

The base points of a given column of punch-outs is always placed between two column of base points aligned in the opposite direction. This maximizes the number of nails on the nail plate surface, while simultaneously maintaining maximum stability.

The present invention is also directed to the nail plate manufacturing procedure. This procedure is characterized by making row after row of tongue-shaped punch-outs in a moving sheet metal strip, at right angles to the strip, and bending over the tongues to form nails, the strip being severed in a stepped pattern after a certain number of rows.

This procedure is particularly cost-effective because it causes no strip or plate waste. To this is added the advantage that the procedure can be carried out with simple equipment, since the individual stamping tools can be placed in parallel. The advantage of cost-effective production is of particular importance, since nail plates are a mass-produced article.

The manufacture of right and left nail plates, i.e. nail plates cut to rise, respectively, to the left and to the right, is also very simple in terms of the present invention, Here it is possible to use the same stamping tools, repositioning only the severing cut.

Finally, the present invention is directed to the use of the nail plates. The nail plate is applied so that the stepped front and rear edges of the plate run essentially parallel to the seam between two adjoining wooden sections. By this application of the nail plate, an exceptionally strong and durable tacking effect is achieved.

BRIEF DESCRIPTION OF THE DRAWINGS:

FIG. 2 shows a composite beam made of two individual beams joied with the nail plates according to the present invention.

FIG. 3 shows a roof rafter assembly using the nail plates according to the present invention.

Figure 1:
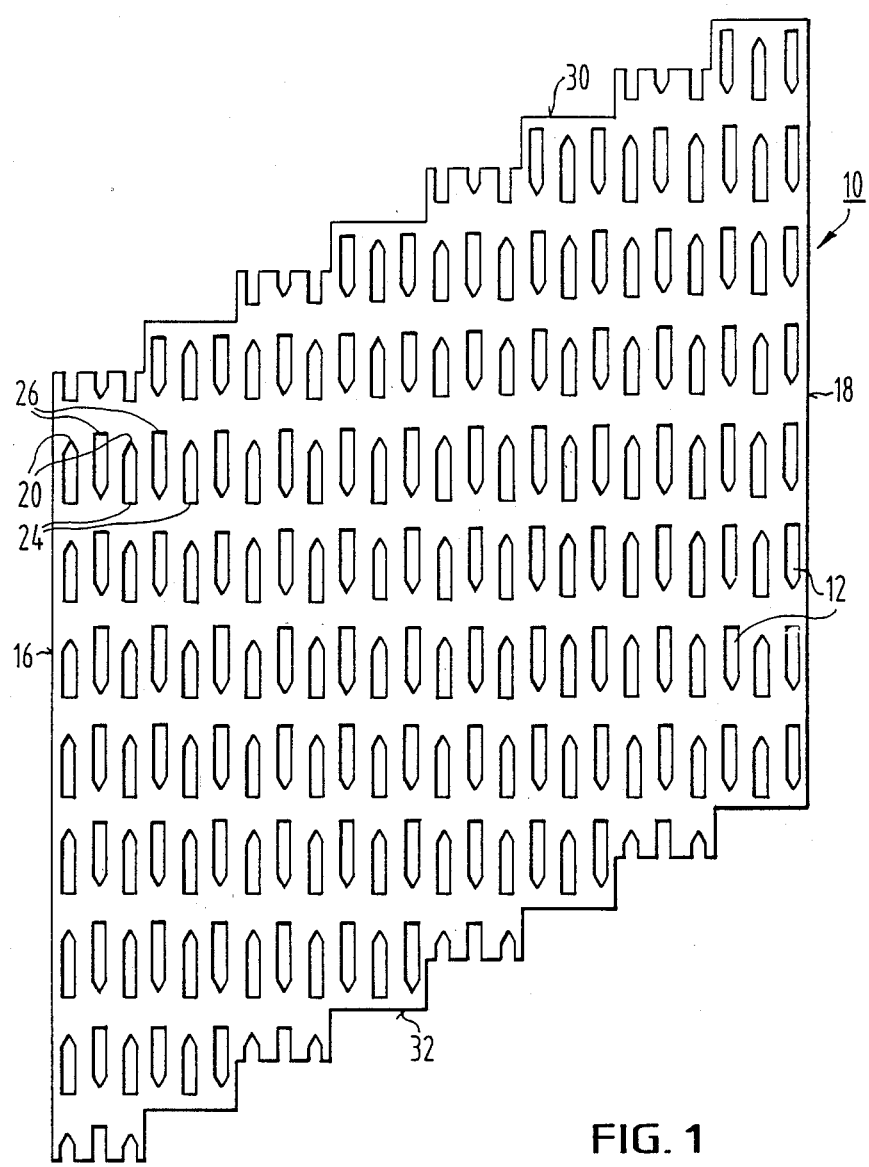
FIG. 1 shows a top view of a nail plate according to the present invention with tongue-shaped nails punched out.

DESCRIPTION OF PREFERRED EMBODIMENTS:

The invention is described in detail in connection with the following embodiments and the drawings, which are intended as exemplary only and not limiting.

FIG. 1 shows a top view of a nail plate 10 according to an embodiment of the present invention. The punch-outs 12 are parallel to the longitudinal edges 16 and 18 of the plate 10, and the punched-out tongues have been bent over to form nails. Every column of punch-outs is parallel relative to the lateral edges 16 and 18, while the direction of alignment alternates with each column. The punch-outs are laid out so that the points 20 of a given column of punch-outs fall between two punch-outs aligned in opposite directions in adjacent columns. However, a sufficient distance is maintained between the bases 24 of a column of punch-outs and the bases 26 of the next column of punch-outs, to ensure that the points 20 of the respective punch-outs do not extend between the corresponding pairs of the otherwise adjacent, similarly-oriented bases 24, 24 (or 26, 26). This ensures that the area between two bases 24, 24 (and between bases 26, 26) remains intact from any punch-out. The nail plate is thus given exceptionally high stability.

The front edge 30 and rear edge 32 of the nail plate have a stepped design, extending from bottom left to upper right. According to the invention, this design has the desired effect of giving the nail plate 10 an approximately rhomboidal external form.

FIG. 2 illustrates a composite beam consisting of two beams 34 and 36, joined by means of the nail plates 10. Wedges 38 show two supports on which the two ends of the composite beam rest.

As shown in FIG. 2, The nail plates 10 according to the present invention are nailed into the two beams in such a way that the stepped front and rear edges 30 and 32 of the nail plates form a column roughly parallel to the seam 33 between the two connected beams 34 and 36. By this arrangement, the columns of nails parallel to the longitudinal sides 16 and 18 of the nail plate, as well as the transverse rows of nails extending across the nail plate, will run diagonally to the seam 33. In this way an exceptionally strong tacking effect is achieved.

As is further evident from both FIGS. 1 and 2, the total surface area of nail plate 10 is available for the application of nails. This allows an exceptionally good tacking effect for the composite beam.

FIG. 3 shows a roof rafter construction using a joist 40 and two rafters 42, as well as two diagonal supports 44. The joist 40 and rafters 42 are joined by means of the nail plates 10 of the present invention. The joist 40 is also tightly joined to the diagonal supports 44 using the described nail plates 10. As shown in this diagram, the nail plates 10 of the present invention can also be used together with other nail plates 46 for the purpose of composite constructions.

The present invention allows for a variety of similar nail plate designs and numerous advantageous applications, as would be apparent to a worker in the art in possession of the present disclosure.

What is claimed is:

1. A nail plate, comprising
   a sheet metal plate having a pair of longitudinal edges parallel to each other, and front and rear edges aligned effectively parallel to each other and diagonally to said longitudinal edges, said sheet metal plate having the form of a rhombus with edges constituted by said longitudinal edges and said front and rear edges,
   each of said diagonal front and rear edges comprising a plurality of steps, each said step comprising a respective first edge extending effectively transversely to said longitudinal edges and a respective second edge extending effectively in parallel to said longitudinal edges, and
   plural columns of nails formed by tongue-shaped punch-outs in said metal plate, each said column of punch-outs and each said punch-out in each said column being arranged parallel to said longitudinal edges, with all of said punch-outs in each said column being aligned in a respective direction for that column, said punch-outs in adjacent ones of said columns being aligned in opposite directions, and each said punch-out aligned in either one of said opposite directions being located at the same respective position along its column as a respective punch-out in each other column having the punch-outs arranged in the same direction,
   wherein each said nail has a respective base end that is connected to a respective base portion of said nail plate at one end of the respective punch-out, and the length of said punch-outs and the positions of the oppositely-aligned punch-outs between each closest pair of columns in which the punch-outs are aligned in the same direction are such that the sheet metal of the plate extends uninterruptedly between said base portions of said respective punch-outs aligned in the same direction but in different columns and at the same respective positions along said columns, and
   wherein the uninterrupted extension of the sheet metal of the nail plate extends in the direction transverse to said longitudinal edges and said columns, between each respective pair of said base portions of said punch-outs at said same respective positions in said adjacent rows having their punch-outs aligned in the same one direction.

2. The nail plate of claim 1, each said step along said front edge corresponding to an opposing step of equal length on said rear edge.

3. The nail plate of claim 1, wherein each said column of nails is equally spaced from each adjoining one of said columns of nails.

4. The nail plate of claim 1, wherein said punch-outs are uniformly distributed over the entire surface area of said sheet metal plate.

* * * * *